United States Patent

[11] 3,605,089

| | | |
|---|---|---|
| [72] | Inventor | George W. Gray<br>Boise, Idaho |
| [21] | Appl. No. | 841,496 |
| [22] | Filed | July 14, 1969 |
| [45] | Patented | Sept. 14, 1971 |
| [73] | Assignee | J.A. Terteling & Sons<br>Boise, Idaho |

[54] PHYSICAL INVENTORY SCANNING AND RECORDING SYSTEM
12 Claims, 2 Drawing Figs.

[52] U.S. Cl. .................................................. 340/172.5
[51] Int. Cl. .................................................. G06f 3/05
[50] Field of Search .................................... 340/172.5

[56] References Cited
UNITED STATES PATENTS

| 2,905,520 | 9/1959 | Anderson | 340/172.5 X |
| 3,142,820 | 7/1964 | Daniels | 340/172.5 |
| 3,260,998 | 7/1966 | Fluegel | 340/172.5 |
| 3,350,687 | 10/1967 | Gabrielson et al. | 340/172.5 X |
| 3,374,461 | 3/1968 | Anderholm et al. | 340/172.5 X |

Primary Examiner—Raulfe B. Zache
Attorney—Naylor and Neal

ABSTRACT: In the system, the weight of items physically present in defined increments of inventory placed on electrical transducer units continuously responsive to the weight of those items is sequentially monitored to provide a record of current inventory. The outputs of the weight-responsive transducer units are translated into signals representing the weight of the inventoried items and this information is stored in a computer accessible memory bank or other storage media, i.e. magnetic tape, paper tape, disc storage, etc. Provision may optionally be included to selectively impart identifying data to the transducer signal for storage along with the corresponding inventory weight through the use of a signal generating encoder which selectively attaches to the system at the site of the respective transducer units.

3,605,089

PHYSICAL INVENTORY SCANNING AND RECORDING SYSTEM

BACKGROUND OF THE INVENTION

The present invention is concerned with a system for the automatic compilation and constant updating of a record of physical inventory, and particularly, one to keep track of a large stock of numerous items which enjoys a rapid turnover. Accordingly, this invention makes keeping a constant inventory practicable in environments in which conventional methods would be very difficult to use. This invention is further adapted to create a record which may be directly employed by high-speed data processing equipment.

The system employs pressure sensitive transducers at the point of storage to continuously measure the weight of inventory items there present. From the output of the transducers, a record of current inventory is stored which may be instantaneously interrogated for a report by high-speed data processing equipment. Application of the system to, for instance, a chain of grocery markets would avail the central administrators of the instantaneous condition of the shelf stock and would facilitate daily ordering of inventory. It could thereby minimize costly storage facilities both at a central warehouse and at the individual markets. In addition, the spoilage of perishables could be kept to a minimum. In such an application, telephone communication lines or radio transmissions could be used to connect the market located elements of the system with the centrally located elements. This practice is common to the data processing art.

In the prior art, the satisfactory alternatives to a manual count of inventory were few. Constant inventory accounting methods in which all transactions into and out of stock must be recorded are meticulously slow and expensive. Often, the derived inventory inaccurately represents what is actually in stock due to unaccounted for transactions, improper description of an item involved in a transaction, unaccounted for pilferage, spoilage, breakage, etc.

The prior art also suggests telemetry inventory systems of the type disclosed in U.S. Pat. No. 3,365,700. These are designed to scan the condition of the inventory in response to an interrogating signal and should prove more accurate and rapid than the manual accounting methods. Such systems are believed impractical for use with data processing equipment, however, because of the inherent slowness of a system which scans the condition of the entire stock only in response to an interrogating signal, and which relies on the operation of mechanical components used therein.

The present invention avoids these and other shortcomings of the prior art by compiling an inventory record in a storage unit which is "on line" with a computer system and which therefore can be accessed quickly and without inertial motion of any part of the system. Furthermore, prior art interrogating systems are often too cumbersome and expensive to use as a method of evaluating an advertisement for a single day, wherein this system can provide the beginning and ending inventory, of any desired period of time.

As a basic component, the system comprises a plurality of pressure-responsive transducers upon which items of stock rest. These transducers are sequentially "read" by scanning means, and the information is recorded in a storage unit to create an inventory record. This record, once created, is constantly updated with each scanning sequence, and exists in constant preparedness for computer interrogation, or, can be recorded onto magnetic tape, paper tape, disc or other media that could be physically transported to a reader in order to transfer the information to a computer processor.

As another feature of the system, a signal generating and encoding device may be selectively connected to the system at the site of the transducers to impart identifying data to accompany the transducers' output which is also recorded in the storage unit to facilitate computer interrogation, or recorded onto portable media, i.e. magnetic tape, paper tape, disc or other media to be transported to a computer for processing.

DESCRIPTION OF THE ILLUSTRATED EMBODIMENT

Figure 1:
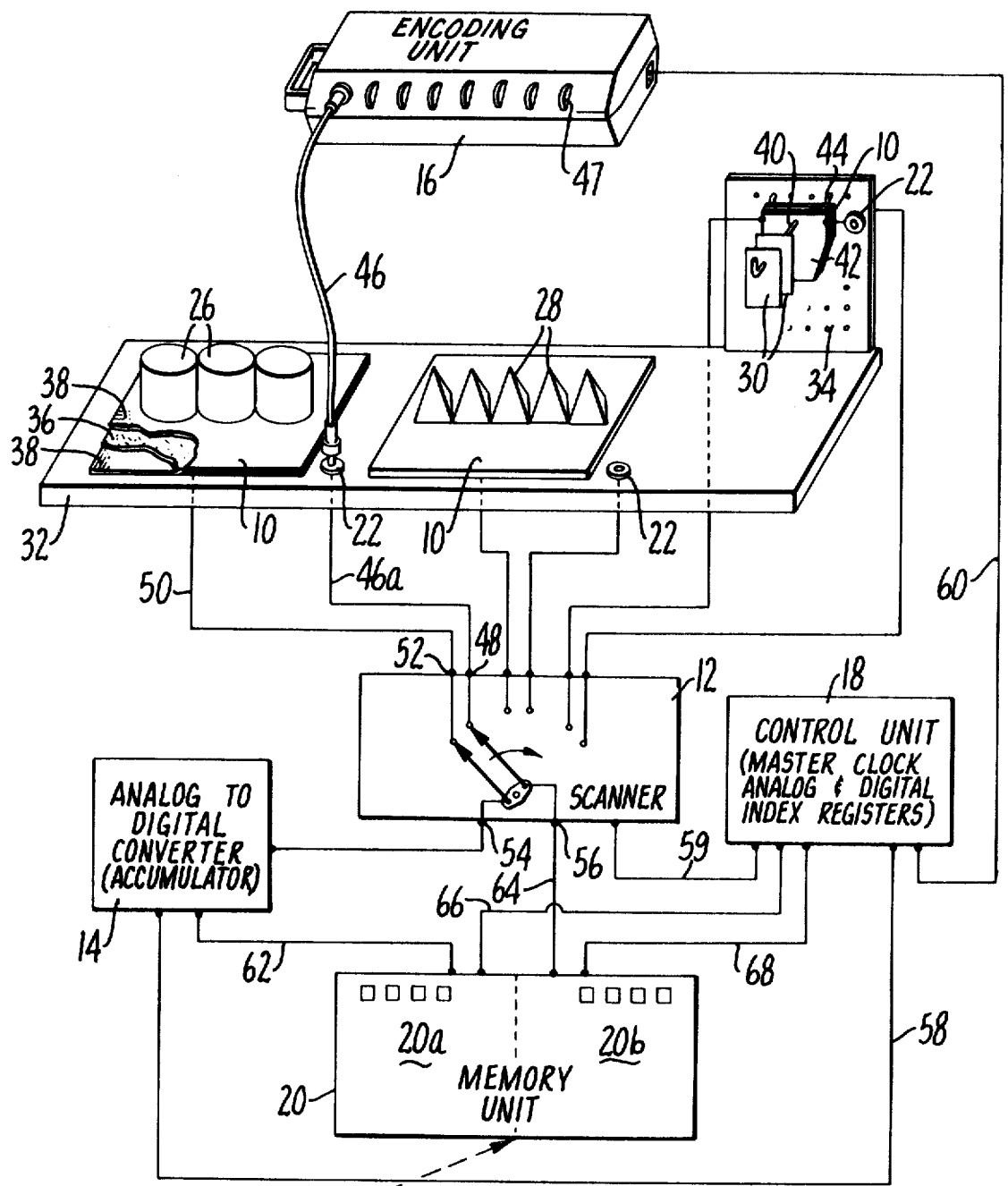
FIG. 1 is a diagrammatic representation of the system showing the functional interconnection among the elements with an associated computer processing unit shown in phantom.

The diagrammatic representation of FIG. 1 shows the functional interconnection among the elements comprising the inventory scanning system. The principal elements comprise a plurality of transducers 10, a scanner 12, an analog-to-digital converter 14, an encoding unit 16, a control unit 18, and a memory unit 20. The plurality of weight-sensitive transducers 10 are electrically coupled to a scanner 12. A voltage analog signal from a transducer 10 is accessed by the scanner 12 and transformed to a digital signal by the analog to digital converter 14. The analog information is then stored in a separate module 20a of the memory unit 20.

Concurrently with the accessing of a transducer, the scanner 12 accesses an encoder receptacle 22 to which an encoding unit 16 may be electrically connected. The encoding unit 16 provides an identifying code to enable the analog information from a concurrently accessed transducer to be subsequently interpreted such that the number and identity of items at the accessed transducer can be determined upon processing. The code information is then stored in a second module 20b of the memory unit 20 for subsequent processing by a central processing unit 24 shown in phantom in FIG. 1.

The control unit 18 contains a master clock for the operation and interregulation of the scanner 12, the converter 14 and the encoding unit 16. The control unit also contains two index registers to monitor storage of information generated by the transducers 10 and the encoding unit 16. One register, hereafter designated an analog index register, monitors the parallel storage of the analog information from the transducer (as digitally transformed by the converter) in memory module 20a. The other register, hereinafter designated a digital index register, monitors the series storage of the digital code information generated by the encoding unit in memory module 20b. This information may be subsequently correlated with the analog information from its companion transducers by the central processing unit 24.

In considering the drawings in greater detail, FIG. 1 illustrates three separate increments of distinct stock to be inventoried which are designated, respectively by the numerals 26, 28 and 30. Each generic increment is supported on a separate transducer 10 forming part of the inventive system. A stock shelf 32 is shown supporting two of the transducers and a pegboard wall 34 is shown supporting the third.

Each transducer comprises a continuously variable electrical resistor of matlike configuration which varies in resistance responsive to the load imparted thereto. The diagrammatically illustrated transducer is made up of an electrically nonconductive compressible matrix 36 in which electrically conductive particles are suspended. This matrix 36 is sandwiched between electrically conductive surfaces 38. A pair of conductors attached to respective surfaces 38 leads from the transducer 10 to connect it with other components of the system as described below. Each transducer may have individual physical and electrical characteristics to best adapt it to the size of the storage area in which it will be used and the pressures likely to be exerted upon the transducer by the items of stock stored thereon. For example, increments of stock designated by numeral 30 are suspended on a horizontally extending hook 40. The hook 40 and accompanying plate 42 may be attached to a pegboard wall 34 by pegboard pins 44 at the top of the plate 42. Instead of being altered by the direct weight of the stock, the electrical characteristics of the transducer 10 are altered by the leverage action of the weighted hook and connected plate whereby the transducer is compressed between plate 42 and wall 34. Suitable transducers of this general type are known in the prior art. (See, for example, U.S. Pat. No. 2,305,717.)

Associated with each transducer is the encoder receptacle 22 adapted to receive and make electrical connection with a pair of conductors 46 from the encoding unit 31. The encoding unit 16 shown in FIG. 1 is an analog-to-digital converter which transforms conventional characters of information into a symbolic form which can be electronically interpreted by a computer. Here the encoding unit 16 comprises a series of conventional analog to binary encoding discs. The character marked thumb wheels 47 each direct the positioning of a binary-coded disc. The discs have an arrangement of contact and noncontact area wherein rotation of a disc will cause a variety of contacts to be made or not made by a series of brushes for the disc. The encoding unit 16 is read by sequentially stepping an electronic signal through the series of brushes for each disc thereby emitting a signal-no-signal response pattern. Each disc thereby generates a byte or unit of information comprised of a predetermined number of bits. The sequential operation is continued through each of the discs until the entire encoding unit has been read into the memory unit 20.

To control the sequential reading of the encoding unit, a rotary stepping switch, or alternatively, a cascade of flip-flop stages may be utilized in cooperation with a pulse or clocking signal from the control unit 18. The stepping switch is activated when the scanner accesses a terminal (for example, terminal 48) that is connected to the encoding unit 16. When it is necessary to change the code because of a new type of inventory stacked on a transducer, the manual encoding operation may be done while the encoding unit is detached from the system. In this respect, the encoding unit inherently operates as a buffer presenting only a completed code to the system and hence to the memory unit 20.

Two pairs of conductors 50 and 46a are associated with each of the transducers or mats 10. Each pair of the conductors 50 extends from connection with the mat 10 associated therewith to connection with independent input terminals 52 on the scanner 12, while each pair of the conductors 46a extends from connection with one of the receptacles 22 to connection with independent terminals 48 on the scanner. Although the pairs of conductors 50 and 46a are schematically illustrated by single lines, it should be understood that each is comprised of two independent leads and that each of the terminals 48 and 52 is similarly comprised of two independent terminals, one of which is connected to each of the leads. As noted in the foregoing discussion, the leads making up each of the conductors 50 are connected to the respective surfaces 38 of the transducer 10 associated therewith. Through the overall arrangement a pair of input terminals on the scanner 12 is associated, respectively, with each transducer mat 10 and each receptacle 22. The scanner 12 is adapted to selectively access each pair of associated input terminals 48 and 52. It performs this function through selective electrical connection of each associated pair of terminals 48 and 52 with a pair of output terminals 54 and 56, respectively. This function may be effected, for example, by a four-wafer sequenced switch, or by electronic circuitry which is the equivalent thereof. The scanning function of the scanner is accomplished by cycling the switch to effect the automatic sequential accessing of all of the terminals 48 and 52. This, as will become more apparent from the subsequent discussion, continuously updates the memory of the system and is controlled by the control unit 18.

The output terminal 54 is connected to the analog-to-digital converter 14. This converter may be of any suitable prior art type. It utilizes a plurality of electronic circuits to perform logical functions. The circuitry is employed in combination with an appropriate series of threshold responsive elements (not illustrated) designed to respond when a predetermined value of resistance is present in a transducer mat 10 and, thus, translate the continuously variable outputs of the transducer into discrete representations approximating the continuously variable values. For example, the analog-to-digital converter 14 first transforms the transducer voltage analog into a frequency analog. The master clock in the control unit 18 regulates a pulse count timing gate through line 58 to allow a defined accumulation of frequency pulses to pass to an accumulator or counter in the converter 14. The accumulator may comprise a cascade of flip-flop stages to transform the pulse train to binary form and temporarily store this digital information until transferred to the memory unit 20. Thus, the analog information originating from the transducers is converted into discrete digital representations. In this form, data processing equipment may operate directly on such information.

The control unit 18 coordinates the sequential operations of the scanner 12, encoding unit 16 and the converter 14, and, provides for the orderly storage of information in the memory unit 20. The heart of the control unit comprises a master clock (not shown) which in cooperation with conventional electronic circuitry generates a variety of defined pulse signals of electrical characteristics suitable to the operational requirements of each subsystem. Pulse signals emitted through the pair of conductors (schematically illustrated by line 59) drive the sequence switch of the scanner 12 to sequentially access each of the transducers 10 and any encoding unit 16 selectively incorporated into the system.

The pulse signals driving the scanner also operate the analog index register which comprises a flip-flop shift register contained in the control unit 18 to index in the memory module 20a the analog information received from the accessed transducers and digitally transformed by the converter 14. For reasons of economics, the analog index register may also operate as a data source of the address for the binary coded information from the encoding unit 16.

Pulse signals from the control unit 18 are also emitted through a pair of conductors, schematically designated by line 60, to drive the encoder's rotary stepping switch or electronic scanning device to read the encoding unit 16 when accessed. After a defined count, the pulse signals directed to the encoding unit can be switched by conventional electronic circuitry to read the address data temporarily stored in the analog index register. The information from the encoding unit and the accompanying address data retrieved from the analog index register are stored in the separate memory module 20b in the memory. The split memory storage enables processing and retrieval of information from the encoding unit 16 and the converter 14 to occur simultaneously and results in a substantial saving of access time. The memory module 20b is coordinated with the digital index register contained in the control unit 18 to provide for the orderly series storage of the information from the encoding unit and the accompanying address data. This storage is retained and compiled until transferred to another media or precessed by the central processing unit 24 at which time the digital index register may be reset to position zero to again receive and retain new information from the encoding unit 16 and address data from the analog index register.

The digital signals generated by the converter 14, and the signals emanating from the encoding unit 16 with accompanying data from the analog index register are selectively stored in the addressable memory modules 20a and 20b, respectively, of memory unit 20 to create an inventory record. Lines 62 and 64 schematically represent the connections through which these signals are transmitted to the unit. The memory unit 20 is of the type employing a plurality of bistable devices, such as ferromagnetic cores, and associated electronic circuitry. Memory units of this type are commercially available. The registers in the control unit 18 are coordinated with standard address registers in the memory unit 20 through lines 66 and 68. Module 20a of the unit is adapted to receive the incoming series of digital signals from the converter 14 and effect the recordation thereof in locations which are allocated for and which correspond to each separately inventoried item of stock. Each incoming signal is therefore directed to an appropriate location in memory, and is stored there, destroying the signal formerly stored. Thus, the inventory record is being continually updated with each complete cycle of the scanner 12. The inventory record thus provided for each increment of stock may be addressed for ready individual access. Module 20b of the unit is adapted to receive the incoming series of digital signals from the encoding unit 16 and digital address data from the analog index register and effect the recordation thereof in a serial process of storage. The information stored in the two modules of the memory unit 20 may be subsequently correlated and processed when needed. The central processing unit 24, as schematically illustrated in the drawing, may be used for this purpose. Units suitable for this purpose are also commercially available.

The code information from the encoding unit 16 may alternatively be stored in parallel in the memory unit in the same manner as the storage of the analog information, either in a separate memory module, or along with the analog information in a single memory module. The system disclosed, however, is preferred for its substantial savings in hardware and for the flexibility permitted in processing the stored information.

GENERAL LOGIC FLOW CHART

Figure 2:
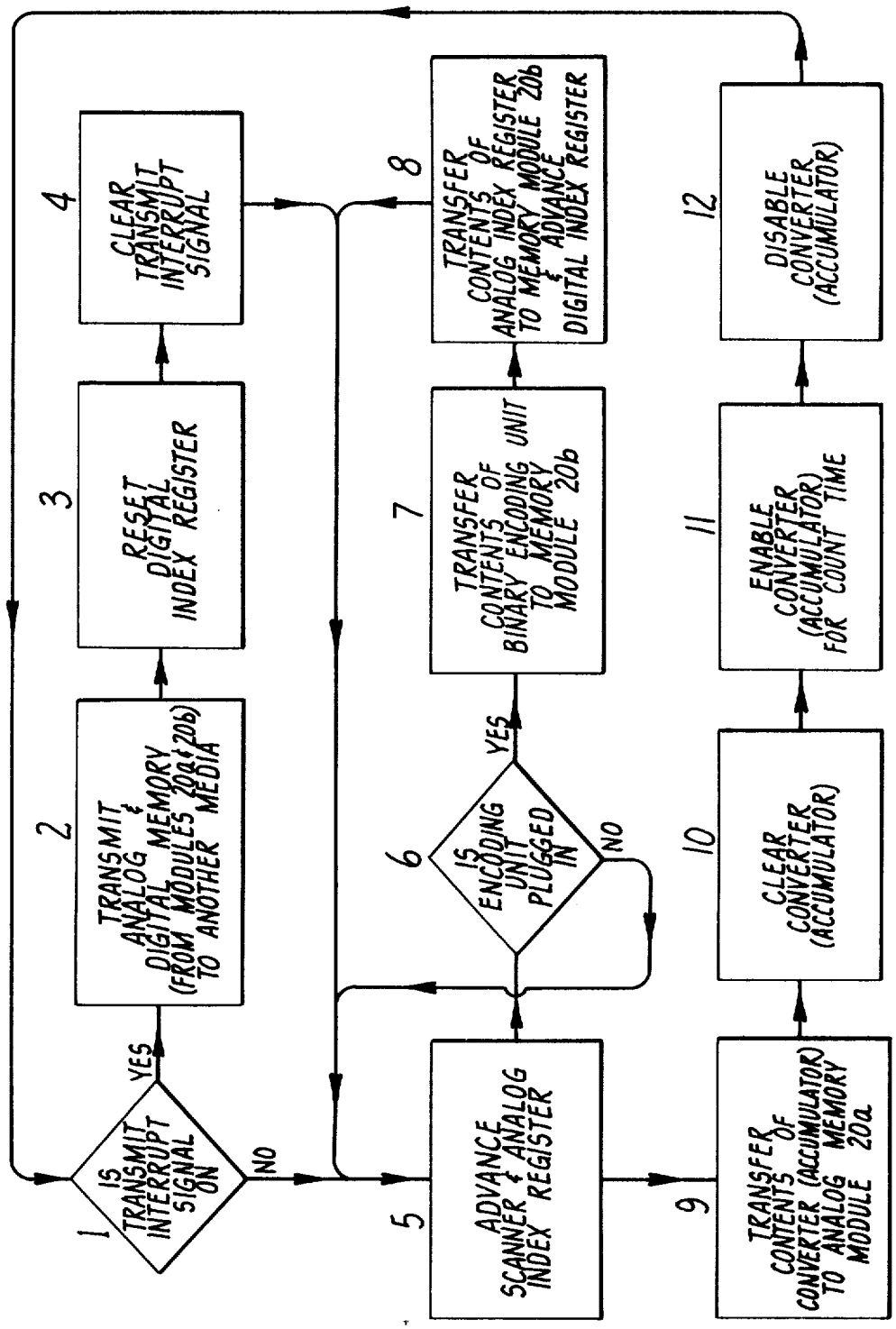
FIG. 2 is a general logic flow chart depicting the sequential operation of the system.

By properly marshalling the various pulse signals from the master clock, an organized and operational sequence can be developed. For the system disclosed, this sequence of operation can be described by the use of a general logic flow chart as shown in FIG. 2. The sequence described is certainly not the only sequence for the component subsystems disclosed, but comprises an operable sequence.

In decision box 1 in FIG. 2 it is first determined if an interrupt signal is "ON" to enable transmission of the stored information in the memory modules 20a and 20b to another media. This transmission should only occur during a period that no information is being sent to the memory unit 20, since the memory unit 20 cannot receive and transmit information at the same time. If the signal is "ON", then the scanning operation is interrupted and transmission from the memory unit 20 is enabled.

In process box 2 information stored in the memory unit is thereupon transmitted to another media which may be to the central processing unit 24 or to a permanent storage media such as magnetic tape, paper tape, punch cards or disc storage.

Process box 3 indicates that the controlling storage registers in module 20b are cleared, resulting in an eventual clearing of the stored information such that new information may be retrieved and again stored in a series manner. In the disclosed system the register reset is desirable to insure that the memory capacity of module 20b is not exceeded through retention of unnecessary information. Resetting after transmission provides an easily interpretable starting point for the series information storage. This process of series storage differs from the manner of storage of analog information from the transducers 10 which after conversion is stored in parallel in fixed addresses in the memory. In the latter process for storage of analog information, new information from the transducers constantly replaces the previously stored information thereby providing the desired updated inventory record for each transducer.

Process box 4 clears the transmit interrupt signal and allows scanning and recording to proceed.

From process box 4 or, alternately, from decision box 1 (if the transmit interrupt signal is not "ON") the sequence proceeds to process box 5. Process box 5 advances the analog index register and the scanner 12 to access the next pair of associated input terminals from the transducer and encoding unit 16, if included. Accordingly, process box 5 initiates the operations represented in decision box 6 and process box 9, which operations, as hereinbefore mentioned, are performed concurrently, i.e., in parallel.

Decision box 6 determines if an encoding unit 16 is plugged in. If not, then no function is performed and the encoding subsystem is inactive and awaits the next advancement of the scanner 12 and analog index register. If the encoding unit 16 is plugged in, then the function of process box 7 is enabled.

Process box 7 performs the transfer of the encoding unit code to memory module 20b. As previously stated, the address of the encoded information must also be stored and such is representationally performed in processing box 8. The address is retrieved from the analog index register and stored with the encoding unit code. The digital index register is then advanced preparatory to the orderly series receipt of the next unit of code and address information.

In process box 9 the transfer of the contents of the converter 14 to memory module 20a is enabled. It may be noted that this information is one step out of phase with the advancement of the scanner and analog index register resulting in a theoretically different address notation between the information received from the transducer and the encoding unit. This, however, does not present any real problem since any correction may be made in processing the information retrieved from the two memory modules. Any difficulty is more than offset by a reduction in retrieval time.

Once the information is transferred, the system is stepped to process box 10 wherein the accumulator in the converter is cleared preparatory to transforming the analog signal from the transducer into a digital notation. Process box 11 indicates the converter is enabled for count time, performing the necessary information transformation. Process box 12 representationally disables the converter, and the digital information is temporarily retained until transferred to memory module 20a. The sequential representation of a cycle of the scanning system is thereby completed and a return to decision box 1 is subsequently effected.

I claim:

1. A physical inventory scanning and recording system to be used in conjunction with a computer system, comprising:
    a. a plurality of electrical transducers, one for each generic increment of stock to be separately inventoried, having a continuously variable, electrical output characteristic responsive to the combined weight of the items supported thereon;
    b. scanning means to sequentially access the outputs of the transducers in a predetermined sequence, said means electrically connected to said transducers;
    c. a memory unit electrically connected with the scanning means, said unit adapted to separately record the most recently accessed outputs from respective transducers;
    d. translating means operatively associated with the scanning means to translate the continuously variable outputs from the accessed transducers into electrical signals which indicate the discrete weight of items in the inventory represented by respective transducer outputs; and
    e. control means to automatically coordinate the operation of the scanning and translating means and sequentially direct the translated outputs of the translating means to the memory unit and update the memory unit for each scanning sequence.

2. An inventory system as described in claim 1, wherein the memory unit is electrically connected with said translating means, said unit being adapted to separately record the most recently generated signals derived from respective transducer outputs.

3. A physical inventory scanning and recording system to be used in conjunction with a computer system, comprising:
    a. a plurality of electrical transducers, one for each generic increment of stock to be separately inventoried, having a continuously variable, electrical output characteristic responsive to the combined weight of the items supported thereon;
    b. scanning means to sequentially access the outputs of the transducers in a predetermined sequence, said means electrically connected to said transducers;
    c. a memory unit electrically connected with the scanning means, said unit adapted to separately record the most recently accessed outputs from respective transducers; and, d. addressing means adapted to function in response to an interrogating signal from the computer system to transmit the signals recorded in the memory unit to the computer system.

4. A physical inventory scanning and recording system to be used in conjunction with a computer system, comprising:
   a. a plurality of electrical transducers, one for each generic increment of stock to be separately inventoried, having a continuously variable, electrical output characteristic responsive to the combined weight of the items supported thereon;
   b. scanning means to sequentially access the outputs of the transducers in a predetermined sequence, said means electrically connected to said transducers;
   c. a first memory unit electrically connected with the scanning means, said unit adapted to separately record the most recently accessed outputs from respective transducers;
   d. encoding means to selectively impart identifying data to the respective transducer outputs; and
   e. a second memory unit electrically connected to said encoding means, said unit adapted to separately record the most recently imparted identifying data corresponding to respective transducer outputs.

5. A physical inventory scanning and recording system to be used in conjunction with a computer system, comprising:
   a. a plurality of electrical transducers, one for each generic increment of stock to be separately inventoried, having a continuously variable, electrical output characteristic responsive to the combined weight of the items supported thereon;
   b. scanning means to sequentially access the outputs of the transducers in a predetermined sequence, said means electrically connected to said transducers;
   c. a memory unit electrically connected with the scanning means, said unit adapted to separately record the most recently accessed outputs from respective transducers;
   d. encoding means to selectively generate identifying data for the respective transducer outputs; and,
   e. means operatively connected to the memory unit to direct storage of the most recent identifying data along with the corresponding transducer outputs in the memory unit.

6. An inventory system as described in claim 5 further comprising a register to generate relative address identifying data for each transducer as the output thereof is scanned and wherein the means operatively connected to the memory unit directs storage of the relative address identifying data in the memory unit along with the identifying data from the encoding means.

7. A physical inventory scanning and recording system to be used in conjunction with a computer system comprising:
   a. a plurality of electrical transducers, one for each generic increment of stock to be separately inventoried, having continuously variable, electrical outputs of characteristics responsive to the combined weight of the items supported thereon;
   b. scanning means to continuously access the outputs of the transducers in a predetermined sequence, said means electrically connected to said transducers;
   c. encoding means to impart an identifying output code to the generic increments of stock associated with the respective transducers when accessed by the scanning means;
   d. a memory unit electrically connected with the scanning means and the encoding means, said unit adapted to record the most recently accessed outputs from respective transducers and to record the identifying output code from the encoding means associated with the respective transducers.

8. An inventory system as described in claim 7 further comprising:
   a. a control unit electrically connected to said scanning means and said encoding means to operate the sequential accessing of the scanning means and to coordinate the operation of the encoding unit with the scanning means;
   b. an analog to digital converter electrically connected to the scanning means to transform the outputs from the respective transducers into digital information signals.

9. An inventory system as described in claim 8, wherein:
said control unit comprises a master clock which emits discrete time-pulse signals to electrically control said sequential operation of the scanning means and to coordinate the operation of the encoding means with the scanning means.

10. An inventory system as described in claim 8, wherein said control unit further comprises:
   a. an analog index register electrically connected to the analog-to-digital converter to order storage of the most recently accessed outputs from respective transducers as transformed by the converter in discrete locations in the memory unit, destroying the digital information signals previously stored for the respective transducers;
   b. a digital index register electrically connected to the scanning means to order the storage of the identifying output codes from the enclosing means to discrete locations in the memory unit, destroying the outputs previously stored for the respective transducers.

11. An inventory system as described in claim 8, wherein said control unit further comprises:
   a. an analog index register electrically connected to the analog-to-digital converter to order storage of the most recently accessed outputs from respective transducers as transformed by the converter in discrete locations in the memory unit destroying the digital information signals previously stored for the respective transducers;
   b. a digital index register to order the series storage of the identifying output code from the encoding means in a separate portion of said memory unit.

12. A process for determining current physical inventory comprising:
   a. generating a plurality of electrical analog signals each representative of the combined weight of a generic increment of stock;
   b. generating a digital identification code for each discrete generic increment of stock;
   c. continuously scanning and accessing the analog signals in a predetermined sequence;
   d. transforming the analog signals as accessed into digital information data;
   e. storing the digital information data and the digital identification code in a memory unit wherein the information is continuously available for transmission to another media including a processing unit;
   f. comparing the digital information data and the digital identification code to determine the number of units in any particular generic increment of stock.